United States Patent [19]

Kato et al.

[11] Patent Number: 5,317,467
[45] Date of Patent: May 31, 1994

[54] DATA RECORDING CARTRIDGE INCLUDING A FLEXIBLE MAGNETIC RECORDING MEDIUM

[75] Inventors: Yoshitake Kato, Mitsukaido; Kazuya Fukunaga, Ibaraki; Akira Katami, Ibaraki; Shinichiro Oda, Ibaraki, all of Japan

[73] Assignee: Hitachi Maxell, Ltd., Osaka, Japan

[21] Appl. No.: 701,823

[22] Filed: May 17, 1991

[30] Foreign Application Priority Data

May 21, 1990 [JP] Japan .................. 2-129164
Oct. 25, 1990 [JP] Japan .................. 2-285757

[51] Int. Cl.$^5$ ............................... G11B 23/02
[52] U.S. Cl. ................... 360/133; 360/132; 369/288; 428/35.7; 428/34.1
[58] Field of Search ............... 360/132, 133; 428/35.2, 428/34.3, 35.7, 35.8, 35.9, 34.1, 137, 156, 913, 64, 65; 369/290, 271, 288

[56] References Cited

U.S. PATENT DOCUMENTS

| | | | |
|---|---|---|---|
| 3,968,306 | 7/1976 | Yoshihara et al. | 428/500 |
| 3,968,309 | 7/1976 | Matsuo et al. | 428/500 |
| 4,629,640 | 12/1986 | Akao | 428/34.3 |
| 4,637,945 | 1/1987 | Masui et al. | 428/35.2 |
| 4,688,128 | 8/1987 | Shiba et al. | 360/132 |
| 4,791,503 | 12/1988 | Yamamoto et al. | 360/132 |
| 5,063,558 | 11/1991 | Takahashi | 360/133 |

FOREIGN PATENT DOCUMENTS

0242158 10/1987 European Pat. Off. .
3239322 5/1983 Fed. Rep. of Germany .

OTHER PUBLICATIONS

Patent Abstracts of Japan, vol. 14, No. 376 (P-1092), 14th Aug. 1990; and JP-A-02 139 779 (Konika Corp.) 29 May 1990 (Cat. A), abstract only Foreign Search Report.
Patent Abstracts of Japan, vol. 10, No. 26 (P-425), 31st Jan. 1986; and JP-A-60 177 481 (Simitomo Kagaku Kogyo) 11 Sep. 1985, abstract only.
Patent Abstracts of Japan, vol. 10, No. 188 (P-473), 3rd Jul. 1986; and JP-A-61 042 281 (Mitsui Toatsu Che. Inc.) 14 Feb. 1986, abstract only.
Patent Albstracts of Japan, vol. 10, No. 230 (C-365), 9th Aug. 1986; and JP-A-61 064 747 (Tory Ind. Inc.) 03 Apr. 1986, abstract only.
Patent Abstracts of Japan, vol. 10, No. 239 (C-367), 19th Aug. 1986; and JP-A-61 073 753 (Toray Ind. Inc.) 15 Apr. 1986, abstract only.
Patent Abstracts of Japan, vol. 12, No. 249 (P-730), 14th Jul. 1988; and JP-A-63 039 183 (Asahi Chem. Co., Ltd.) 19th Feb. 1988, abstract only.
Patent Abstracts of Japan, vol. 14, No. 141 (P-1023), 16th Mar. 1990; and JP-A-02 005 273 (Asahi Chem. Ind. Co., Ltd.) 10 Jan. 1990, abstract only.
Patent Abstracts of Japan, vol. 11, No. 274 (P-612), 5th Sep. 1987; and JP-A-62 073 420 (Teijin Ltd) Apr. 4, 1987, abstract only.
Patent Abstracts of Japan, vol. 9, No. 239 (P-391), 25th Sep. 1985; and JP-A-60 093 626 (Fuji Shahin Film KK) May 25, 1985, abstract only.
Patent Abstracts of Japan, vol. 13, No. 116 (P-845), 22nd Mar. 1989; and JP-A-63 291 216 (Toyobo Co.) Nov. 29, 1988, abstract only.

Primary Examiner—Paul M. Dzierzynski
Assistant Examiner—Kim-Kwok Chu
Attorney, Agent, or Firm—Birch, Stewart, Kolasch & Birch

[57] ABSTRACT

A data recording cartridge provided with a cartridge case and a recording medium accommodated therein, wherein the cartridge case is molded from at least one of the following materials:

(1) composition of uniformly dispersed styrol resin and a polycarbonate resin;
(2) composition of uniformly dispersed styrol resin and a nitrogen containing resin;
(3) composition of uniformly dispersed styrol resin and an ester resin;
(4) styrol resin styrene of which is partially substituted with α-methylstyrene;
(5) styrene-maleic anhydride copolymer modified with rubber;
(6) composition of polypropylene polymer containing an inorganic filler dispersed therein;
(7) copolymer of N-substituted maleimide resin and styrol resin; and
(8) composition of uniformly dispersed N-substituted maleimide resin and styrol resin.

6 Claims, 11 Drawing Sheets

DATA RECORDING CARTRIDGE INCLUDING A FLEXIBLE MAGNETIC RECORDING MEDIUM

BACKGROUND OF THE INVENTION

The present invention relates to a data recording cartridge such as a magnetic disk cartridge and the like inclusive of a flexible magnetic recording medium, and more specifically, to a data recording cartridge and flexible magnetic recording medium having high reliability even at high temperatures. The data recording cartridge referred to in the present invention is a cartridge having a tape-shaped, disk-shaped or card-shaped magnetic recording medium, optical recording medium or semiconductor recording medium accommodated in a cartridge case to which and from which data from a computer or the like is capable of be magnetically, optically or electrically recorded and reproduced. Further, the flexible magnetic recording medium is a tape-shaped, disk-shaped or card-shaped recording medium composed of a flexible substrate such as a plastic film having a magnetic thin film formed thereon which is capable of magnetically recording data.

Discussion of Related Art

Recently, apparatuses employing a magnetic disk are used not only inside a house but also outside as well as in a car. Thus, a strict performance is required of the magnetic disk. More specifically, for example, when a car is parked outside a house in the summer, the temperature of the interior thereof sometimes increases to 80° C. or more, and thus magnetic disks carried by the car and magnetic disks provided with an apparatus incorporated in the car are required to endure these high temperatures. Further, as the disks and the apparatus employing the same are used in very cold regions, the disks are required to have low temperature characteristics also.

Taking the above into consideration, the previously set temperature and humidity requirements of 4° to 53° C. and 8–90% RH have been recently changed to −40° to 85° C. and 8 to 95% RH, respectively, to extend the upper and lower limits of temperature and the upper limit of humidity to satisfy the more demanding conditions.

The expansion and contraction of a flexible magnetic disk caused by temperature and humidity mainly depend upon the temperature and humidity characteristics of a base film.

The base film of the flexible magnetic disk is, for example, a preliminarily biaxially drawn polyethylene terephthalate (PET) film. A magnetic layer having a predetermined thickness is formed on the thus processed base film to make a wide web, and flexible magnetic disks of a predetermined size are stamped therefrom.

Nevertheless, when a magnetic disk cartridge to which this flexible magnetic disk is assembled is left under high temperature and high humidity conditions, the output greatly varies when the signal is reproduced, and thus a problem arises in the reliability thereof To solve this problem, the invention disclosed in Japanese Patent Kokai (Laid-Open) No. Sho 63-261587 is proposed. According to this invention, a flexible magnetic disk and the center core fixed thereto are independently subjected to a heat treatment under conditions of temperature from 50° to 100° C., humidity from 20 to 80% RH, and a treatment time from 12 to 100 hours, or a temperature from 60° to 90° C., a humidity of from 50 to 80% RH, with the treatment time being from 48 to 72 hours.

When the humidity is increased in the heat treatment as described above, the treatment temperature is lowered and the treatment time is shortened, but the flexible magnetic disk is liable to be deformed by increasing the humidity.

Further, ABS resin (acrylonitrile-butadiene-styrene) is usually used as a cartridge case for a conventional magnetic disk cartridge and an optical disk cartridge. Nevertheless, the ABS resin is not always have excellent heat resistance, and when it is left, for example, at a high temperature, as described above, a problem arises in that the cartridge case is thermally deformed. The thermal deformation of the cartridge case is not only a problem regarding the outside appearance thereof but also directly adversely affects recording/reproducing characteristics.

More specifically, in the case of the magnetic disk cartridge, a magnetic disk is partially strongly pressed against a cleaning sheet adhered to the inner surface of the cartridge case because the cartridge case is irregularly deformed to a wave shape and the like and the clearance in the cartridge case decreases, for example becoming smaller than 1.5 mm of clearance in a 3.5 inch magnetic disk cartridge. Accordingly, a disadvantage arises in that the rotational torque of the magnetic disk is increased and a predetermined rotational speed cannot be obtained or the magnetic disk does not rotate at all.

Further, when the cartridge case is expanded to a barrel-shape, the magnetic disk does not come into contact with the cleaning sheet and thus the important recording region of the magnetic disk is not cleaned which leads to error.

On the other hand, in the case of the optical disk cartridge, when the cartridge is inserted into a recording/reproducing unit, the cartridge case partially abuts against a reference position regulating member provided in the unit, so that the optical disk cartridge is vertically positioned in the unit. Further, the vertical clearance between the reference position regulating member and an optical head (beam spot formed by irradiating a beam from the optical head) is kept constant by a mechanical connection.

Accordingly, when the optical disk cartridge housed in a cartridge case, which is thermally deformed as described above (in particular, a cartridge case deformed to a concave or convex shape at the portion thereof abutting against the above reference position regulating member), is inserted in the recording/reproducing unit and positioned therein, the position of a beam spot with respect to the recording film of the optical disk is vertically (in an optical axis direction) deviated by an amount of the deformation of the cartridge. This deviation caused during recording a signal, gives an insufficient recording power to the recording film and thus a desired recording pit cannot be formed. Further, this deviation caused during recording a signal gives an insufficient reproducing power to the recording film and thus not only the S/N is lowered but also a problem of cross-talk arises to thereby lower reliability, when an amount of the deviation is large. In particular, since a distance between tracks necessarily becomes smaller to realize an optical disk of a higher recording density, the positional deviation of a beam spot with respect to the recording film poses an important problem.

SUMMARY OF THE INVENTION

An object of the present invention is to overcome these disadvantages of the prior art and to provide a flexible magnetic recording medium of high reliability, and a method of manufacturing the same.

To achieve the above objects, the present invention is characterized by, for example, a magnetic disk cartridge or an optical disk cartridge provided with a cartridge case and a recording medium accommodated therein, wherein the cartridge case is molded from at least one of the following materials:
  (1) composition of uniformly dispersed styrol resin and polycarbonate resin;
  (2) composition of uniformly dispersed styrol resin and nitrogen containing resin;
  (3) composition of uniformly dispersed styrol resin and ester resin;
  (4) styrol resin styrene of which is partially substituted with α-methylstyrene;
  (5) styrene-maleic anhydride copolymer modified with rubber;
  (6) composition of polypropylene polymer containing an inorganic filler dispersed therein;
  (7) copolymer of N-substituted maleimide resin and styrol resin; and
  (8) composition of uniformly dispersed N-substituted maleimide resin and styrol resin.

To achieve the above objects, the present invention is further characterized by a magnetic disk cartridge provided with a cartridge case and a disk-shaped flexible magnetic recording medium composed of a non-magnetic base film having a magnetic thin film formed thereon and rotationally accommodated in the cartridge case, wherein the above flexible magnetic recording medium has a maximum thermal contraction of 30 micrometers or less when left for 96 hours in an environment of 85° C. and 40% RH and the cartridge case is from at least one of the following materials:
  (1) composition of uniformly dispersed styrol resin and polycarbonate resin;
  (2) composition of uniformly dispersed styrol resin and nitrogen containing resin;
  (3) composition of uniformly dispersed styrol resin and ester resin;
  (4) styrol resin styrene of which is partially substituted with α-methylstyrene;
  (5) styrene-maleic anhydride copolymer modified with rubber;
  (6) composition of polypropylene polymer containing an inorganic filler dispersed therein;
  (7) copolymer of N-substituted maleimide resin and styrol resin; and
  (8) composition of uniformly dispersed N-substituted maleimide resin and styrol resin.

To achieve the above objects, the present invention is further characterized by a flexible magnetic recording medium composed of a non-magnetic base film having a magnetic thin film formed thereon, wherein the flexible magnetic recording medium has a maximum thermal contraction of 30 micrometers or less when left for 96 hours in an environment of 85° C. and 40% RH.

To achieve the above objects, the present invention is further characterized by a method of manufacturing a flexible magnetic recording medium composed of a non-magnetic base plastic film having a magnetic thin film formed thereon, which comprises the step of forming the magnetic thin film on the base film and then subjecting the base film to a heat treatment under the conditions of a temperature of 90° C. or more and humidity of 20% RH or less, wherein the resulting flexible magnetic recording medium has a maximum thermal contraction of 30 micrometers or less when left for 96 hours in an environment of a temperature of 85° C. and humidity of 40% RH.

The present invention can improve all of the heat resistance and high impact resistance as well as the mechanical properties, such as bending and tensile strengths and the like, of a cartridge case and provide a data recording disk cartridge of high reliability by defining the material of the cartridge case as described above.

Further, the above flexible magnetic disk has a very small signal level variation even if operated at a high temperature when the maximum amount of the contraction thereof is set to 30 micrometers or less under the conditions that, for example, after the magnetic thin film has been formed on the base film, the base film is subjected to a heat treatment under the conditions of a temperature of 90° C. or more and a humidity of less than 20% RH and then the above flexible magnetic disk is left under an environment of 85° C. and 40% RH for 96 hours, and thus the present invention can provide a flexible magnetic disk of high reliability.

BRIEF DESCRIPTION OF THE DRAWINGS

The present invention will be described with reference to the following drawings, wherein.

DETAILED DESCRIPTION OF THE INVENTION

As described below, according to the present invention, the heat resistance and impact resistance of a cartridge case can be improved by molding the cartridge case from a composition (polymeralloy) of styrol resin and polycarbonate resin.

Further, as described below, the present invention can improve the heat resistance of a cartridge case by molding it from the composition (polymeralloy) of styrol resin and nitrogen containing resin.

Further, as described below, the present invention can improve the heat resistance and the mechanical strength such as bending and tensile strengths of a cartridge case by molding it from the composition (polymeralloy) of styrol resin and ester resin.

Further, as described below, the present invention can improve the heat resistance and moldability of a cartridge case by molding it from styrol resin styrene of which is partially substituted with α-methylstyrene or styrenemaleic anhydride copolymer modified with rubber.

Further, as described below, the present invention can improve the heat resistance and impact resistance of a cartridge case by molding it from a polypropylene polymer composition containing an inorganic filler dispersed therein.

Further, as described below, the present invention can improve the heat resistance of a cartridge case by molding it from the copolymer of N-substituted maleimide resin and styrol resin or polymeralloy of N-substituted maleimide resin and styrol resin.

With these materials, a data recording cartridge excellent in the reliability of recording/reproducing properties can be provided.

Further, a magnetic disk cartridge can be provided which is excellent in reliability and has a cartridge case and a flexible magnetic recording medium both of which are not thermally deformed by using both the cartridge case molded from the below-described materials and the disk shaped flexible magnetic recording medium having an excellent size stability, as described below.

Preferred Embodiments

Example 1

Figure 1:
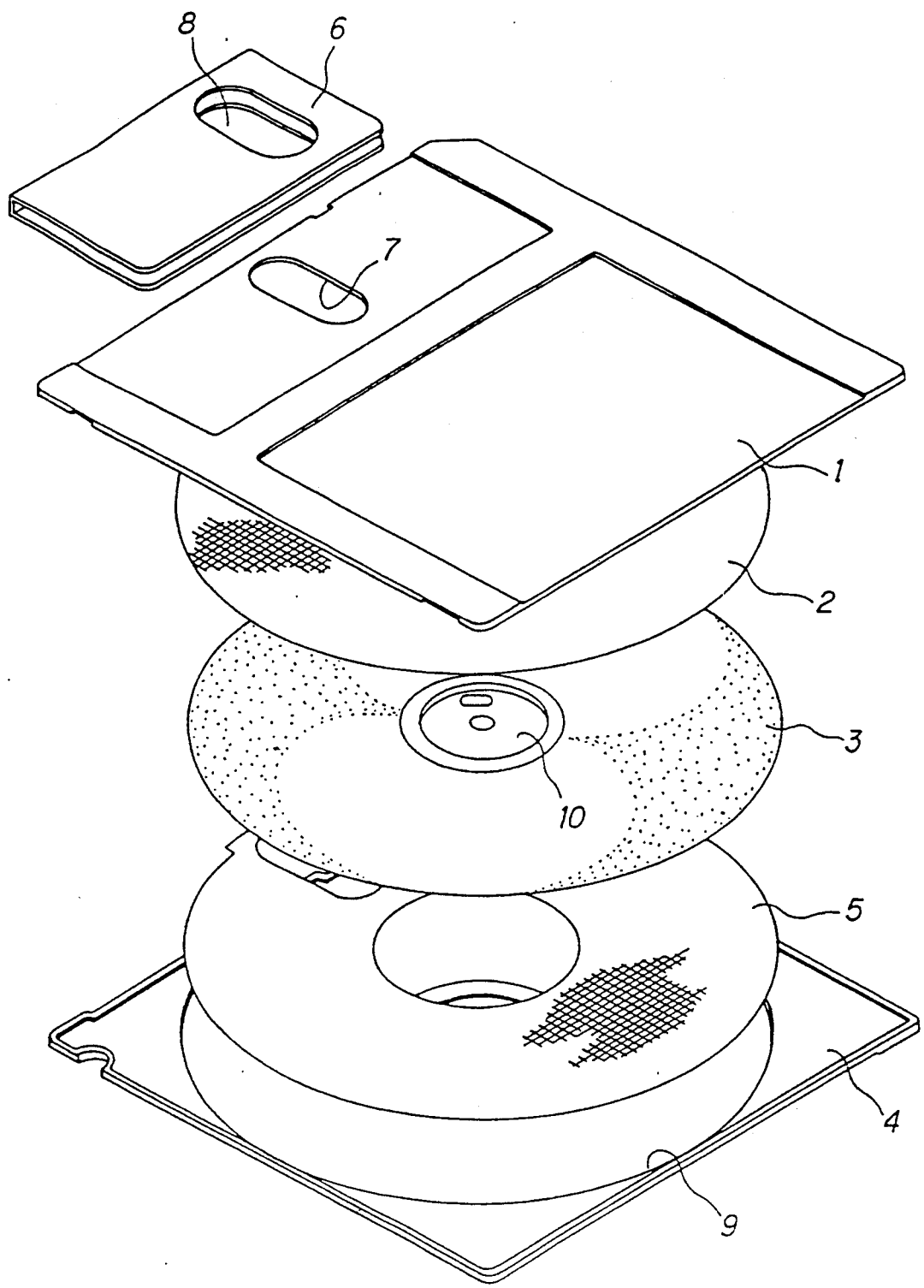
FIG. 1 is an exploded perspective view of a magnetic disk cartridge according to an example of the present invention.
Figure 2:
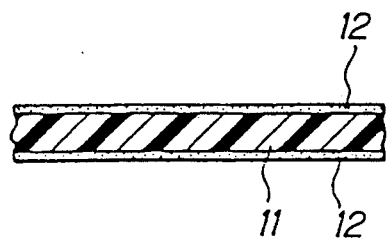
FIG. 2 is an enlarged cross sectional view of a magnetic disk used in the magnetic disk cartridge.
Figure 3:
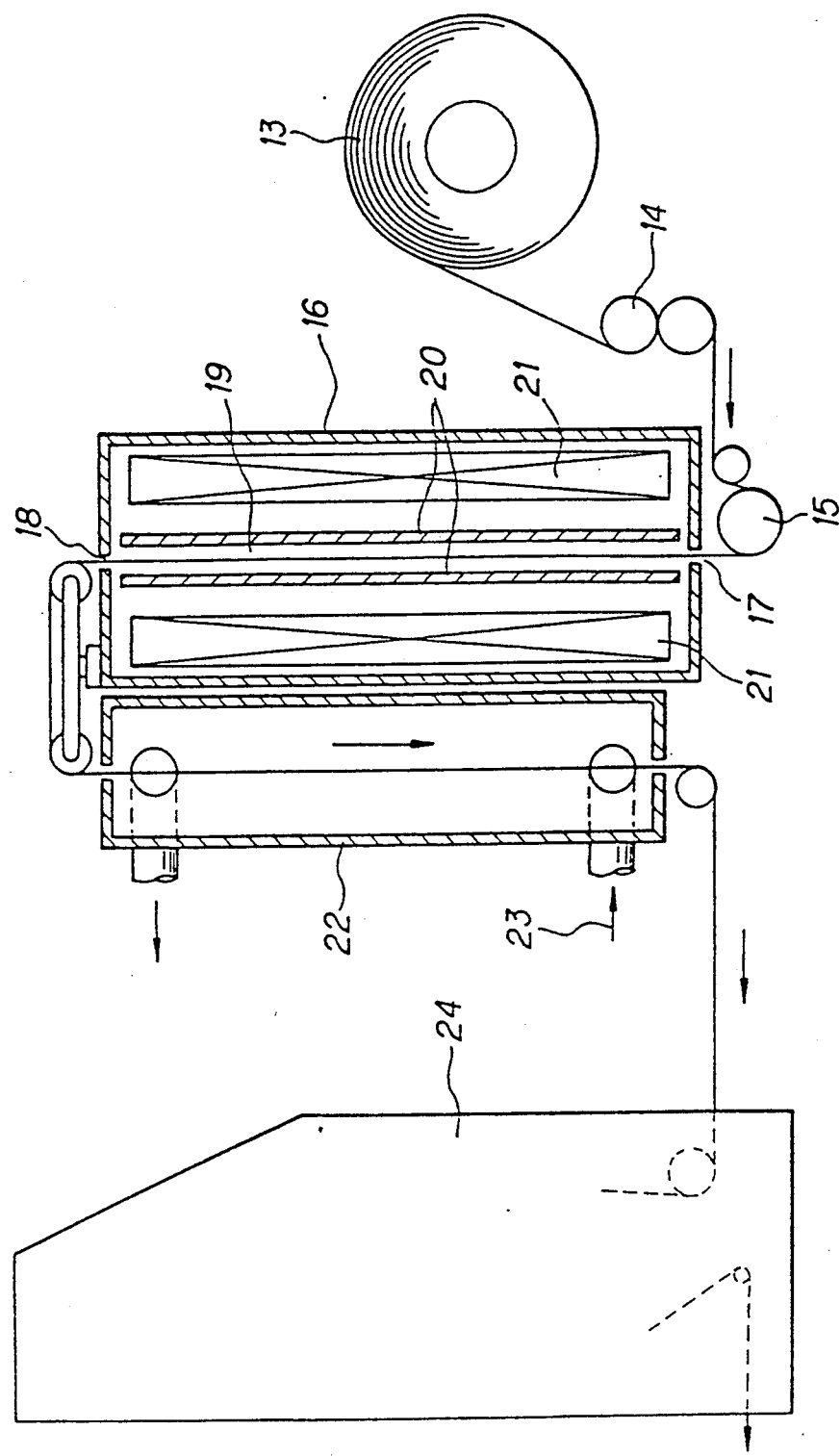
FIG. 3 is a schematic arrangement showing a process for treating a web film.

FIG. 1 is an exploded perspective view of a magnetic disk cartridge according to an example of the present invention, FIG. 2 is an enlarged cross sectional view of a magnetic disk used in the magnetic disk cartridge, and FIG. 3 is a schematic arrangement showing a process for processing a web film.

As shown in FIG. 1, the magnetic disk cartridge is mainly composed of an upper case 1, an upper cleaning sheet 2 adhered to the inner surface thereof, a flexible magnetic disk 3, a lower case 4, a lower cleaning sheet 5 adhered to the inner surface of the lower case 4, and a shutter 6.

The above shutter 6 is used to open and close a head insert port 7 defined in each of the upper case 1 and the lower case 4 and has a opening 8 having a size substantially the same as that of the head insert port 7. A substantially circular recess 9 is defined in the inner surface of each of the above upper and lower cases 1 and 4 (only the lower case 4 is shown) to adhere the above upper and lower cleaning sheets 2 and 5 to a predetermined place. Further, a hub 10 composed, for example, of a metal thin plate such as a stainless steel plate or the like is fixed to the center of the magnetic disk 3.

The above upper and lower cleaning sheets 2 and 5 are composed of a material similar to that used in another example to be described below.

As shown in FIG. 2, the above magnetic disk 3 is composed of a base film 11 of 30 to 75 micrometers thick and a magnetic layer 12 of 0.5 to 4 micrometers thick coated on the surfaces thereof (although the magnetic layer is coated on both surfaces in this example, some times it is coated on only one surface).

As the above base film, for example, polyethylene terephthalate (PET), polyethylene naphthalate (PEN), aromatic polyamide, and polyimide, etc., are used.

An example of the composition of a magnetic paint forming the above magnetic layer 12 is as shown below.

| Composition Ratio of Magnetic Paint | |
| --- | --- |
| Co containing $\gamma$-Fe$_2$O$_3$ (Coercive Force: 740 Oe, Average Particle Dia.: 0.4 μm, Axial Ratio: 10) | 100 parts by weight |
| Nitrocellulose | 19 parts by weight |
| Polyurethane (Tg: 42° C.) | 12 parts by weight |
| Alumina Fine Particles (Average Particle Dia.: 0.43 μm, Spherical) | 10 parts by weight |
| Carbon Black (Average Particle Dia.: 30 mμm) | 16 parts by weight |
| Oleyl Oleate | 6 parts by weight |
| Butyl Cellosorb Stealate | 1 part by weight |
| Cyclohexanone | 200 parts by weight |
| Toluene | 200 parts by weight |

The composition was mixed and dispersed in a ball mill for 72 hours, added with 8 parts by weight of a three functional isocyanate linking agent and further dispersed for 1 hour to make the magnetic paint. The magnetic paint was coated on a wide base film and dried and the base film was subjected to a calendaring treatment to form a magnetic layer of a predetermined thickness to provide a wide web film.

FIG. 3 is a schematic arrangement showing a process for processing the web film.

The web film 13 made as described above and wound to a roll shape was unwounded by a unwinding roll 14 and fed to a heater box 16 through a preheat roll 15. The heater box 16 is provided with an inlet 17 at the lower side thereof and an outlet 18 at the upper side thereof and a film path 19 is defined therebetween. Dumpers 20 are disposed on both sides of the film path 19 and further ceramic heaters 21 are disposed outside the dumpers.

The above web film 13 is heated by the heater box 16 while being passed therethrough so that the temperature thereof is increased to 90° C. or more or preferably to 95° C. or more and the humidity thereof is less than 20% and preferably less than 10% RH in the state that an external force such as a tension is applied to the web film as small as possible. The upper limit of a treatment temperature is preferably about 250° C.

The web film 13 subjected to the heat treatment is fed to a cooler box 22 adjacent to the heater box 16 and cooled by a cooling gas 23 (for example, dust free dry air) flowing therein. The reason why the temperature of the web film 13 is returned near to a normal temperature is to stabilize the quality thereof by forcibly cooling it under the predetermined environment and conditions so that the cooling conditions are not affected by season and climate.

The web film 13 cooled near to the normal temperature as described above is fed in a slitter 24 and cut to a predetermined width by cutters. Note, although many stages of rollers and the cutters are provided in the slitter 24, they are not shown to avoid complication of the figure. The film cut to the predetermined width by the slitter 24 is stamped to a disk-shape and then the hub 10 is fixed thereto by e.g. an adhesive, to thereby provide the magnetic disk 3.

Figure 4:
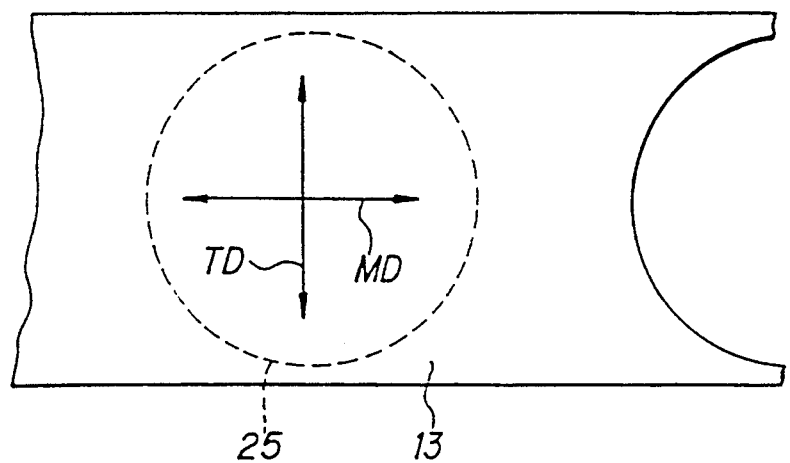
FIG. 4 is a diagram explaining the longitudinal direction and lateral direction on the web film.

A polyethylene terephthalate film of 75 micrometers thick is used as the base film and a magnetic layer of 1 micrometer thick is formed on both surfaces thereof to constitute the web film 13. The web film 13 is heat treated under the conditions to be described later and stamped to a disk 25 of 3.5 inches in diameter after being slit. FIG. 4 is a diagram showing the longitudinal direction and lateral direction of the web film 13, wherein the arrows MD in the figure show the longitudinal direction of the web film 13 and the greatest extension of the film is given in this direction while the film is manufactured. The arrows TD in the figure show a lateral direction perpendicular to the longitudinal direction MD and the degree of extension in this direction is smaller than that in the longitudinal direction MD. Disks 25 are continuously and effectively stamped from the web film 13.

Figure 5:
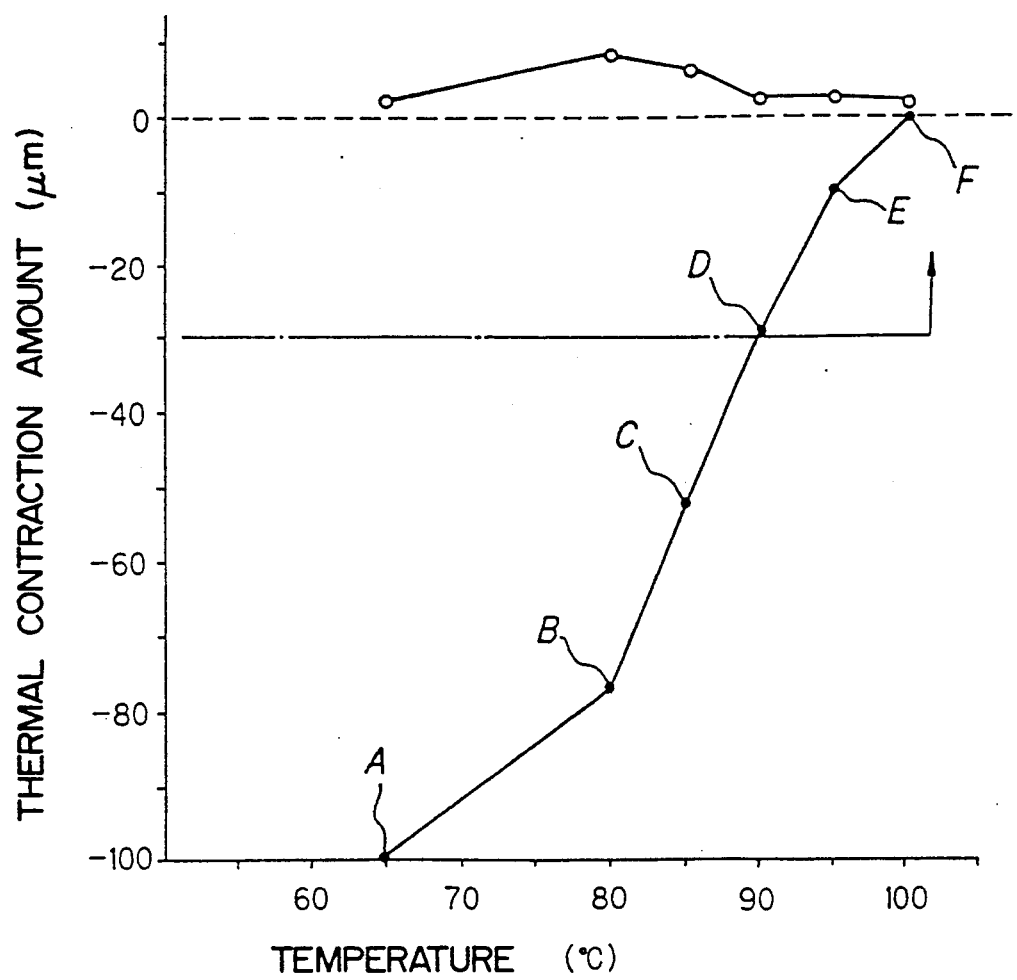
FIG. 5 is a characteristic diagram showing a heat treatment temperature of the web film and an amount of thermal contraction of a disk when the web film is applied to the disk after being kept under an environment of 85° C. and 40 RH for 96 hours on the completion of the heat treatment.

The amount of the thermal contraction of each of the thus stamped disk specimens was measured after they were left for 96 hours (4 days) at 85° C. and 40% RH and FIG. 5 shows the result of the measurement.

In the figure, the abscissa shows the temperature at which the web film was heat treated and the ordinate shows the amount of the thermal contraction by negative values. Note that when the web film was heat treated, the humidity was less than 10% RH and a heat treatment time was 2 hours. Further, ● marks in the figure show the amount of the thermal contraction of the web film in the longitudinal direction (MD) and marks ○ show the amount of the thermal contraction (actually, positive values and slightly expanded) of the web film in the lateral direction (TD), respectively.

As apparent from the figure, although the web film has little dimensional change in the lateral direction (TD) thereof, it has a remarkable thermal contraction in the longitudinal direction (MD), and the lower the heat treatment temperature is, the greater the amount of the thermal contraction. More specifically, when the heat treatment temperature is 65° C., the amount of the thermal contraction in the longitudinal direction of (Specimen A in the figure) is as large as 100 micrometers, when the temperature is 80° C., the amount of the thermal contraction of (Specimen B in the figure) is 77 micrometers, and when the temperature is 85° C., the thermal contraction of the (Specimen C in the figure) is 52 micrometers. When the heat treatment temperature is 90° C. or more (Specimens D, E, F in the figure), however, the amount of the thermal contraction can be restricted to 30 micrometers or less (Specimens D, E, F in the figure), and in particular, when the heat treatment temperature is 95° C. or more, the amount of the thermal contraction can be restricted to 10 micrometers or less.

Note that with respect to the dimensional change of the lateral direction (TD) of the web film, when the web film has a large amount of the thermal contraction in the longitudinal direction (MD), it tends to expand by the effect of the contraction, whereas the web film having a small amount of the thermal contraction in the longitudinal direction (MD) has little dimensional change in the lateral direction (TD). This exhibits that the disk has good dimensional stability.

Next, Table 1 shows the result of the measurement of the output level of each of Specimens A to F shown in FIG. 5.

Note that the output level was measured in such a manner that the average output (initial output) from the one round of a track measured under the conditions identical to those of recording below was assumed to be 100% when a signal was recorded at 23° C. and 50% RH by using a magnetic disk drive unit for a 3.5 inches disk having 2M bytes. Specimens and the drive unit were left for 24 hours under the environment of 85° C. and 40% RH, then the above recorded signal was read out and thereafter the minimum output of the outputs from the one round of the track was determined and compared with the above initial output.

TABLE 1

| Specimen Disk | Output Level (%) |
| --- | --- |
| A (Comparative Example -1) | 52 |
| B (Comparative Example -2) | 34 |
| C (Comparative Example -3) | 40 |
| D (Example-1) | 92 |
| E (Example-2) | 98 |
| F (Example-3) | 96 |

As apparent from Table 1, although Specimen Disks A to C have a large variation of the output level when tested under high humidity and high temperature, Specimen Disks according to the present invention D to F have a small variation of the output level even in the test under the above severe condition and have high reliability.

Example 2

Figure 6:
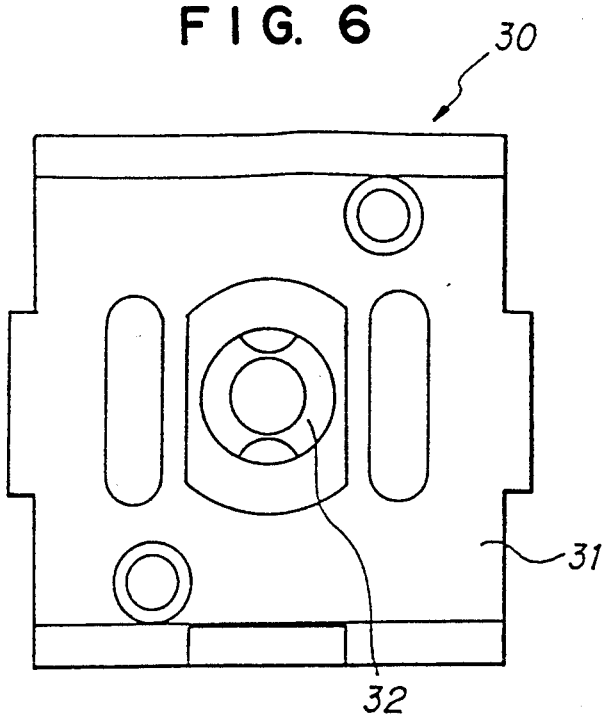
FIGS. 6 and 7 are a plan view and a side view of a magazine.
Figure 7:
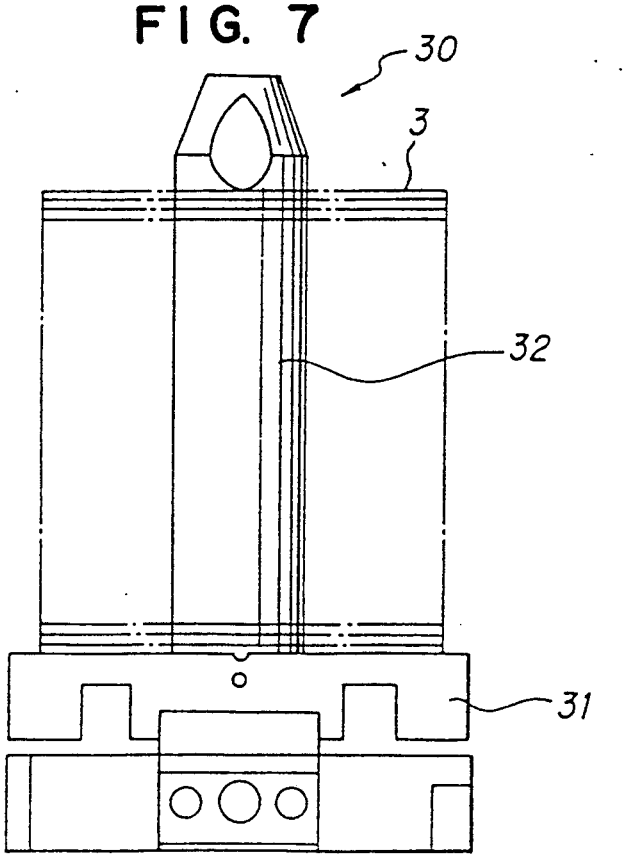
Figure 8:
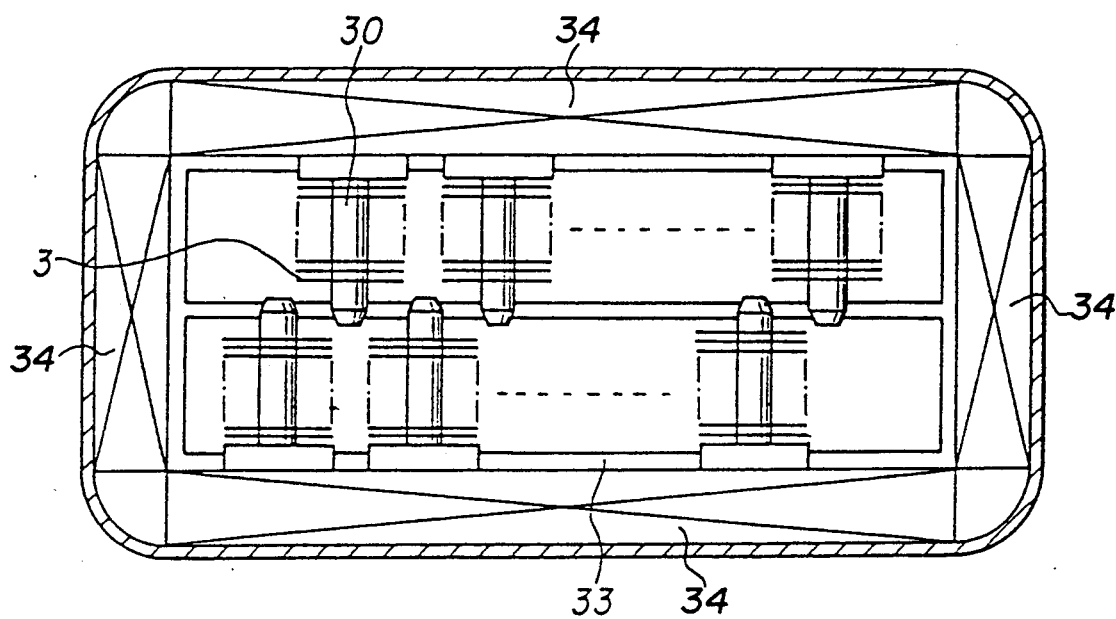
FIG. 8 is a schematic plan view showing respective magazines placed on a heat treatment shelf.

FIGS. 6 to 8 are diagrams showing another example of the heat treatment method, wherein FIG. 6 is a plan view of a magazine, FIG. 7 is a side view of the magazine, and FIG. 8 is a schematic plan view showing respective magazines placed on a heat treatment shelf.

As shown in FIGS. 6 and 7, the magazine 30 is made of a heat resistant synthetic resin and mainly composed of a base 31 and a pin 32 standing at the center thereof.

Magnetic disks 3 of a predetermined size are stamped from a wide web film and piled up with the pin 32 therethrough, as shown in FIG. 7.

The magazines 30 each holding the many piled magnetic disks 3 are sequentially and horizontally placed on the heat treatment shelf 33. A heater 34 is disposed outside the heat treatment shelf 33 and a heat treatment temperature is controlled by changing an amount of electric power supplied to the heater 34. A commercially available blower type high temperature bath can be used as the heat treatment unit. Note, although the heat treatment conditions are substantially similar to those of the above-mentioned example, a heat treatment time is preferably longer because many piled magnetic disks 3 must be subjected to the heat treatment.

In the case of this example, the magnetic disks 3 are horizontally placed to prevent a large amount of an external force from being applied thereto during heat treatment. After the magnetic disks 3 have been subjected to the heat treatment as described above, a hub is mounted to the center of each of the magnetic disks 3 by a usual method.

Example 3

Figure 9:
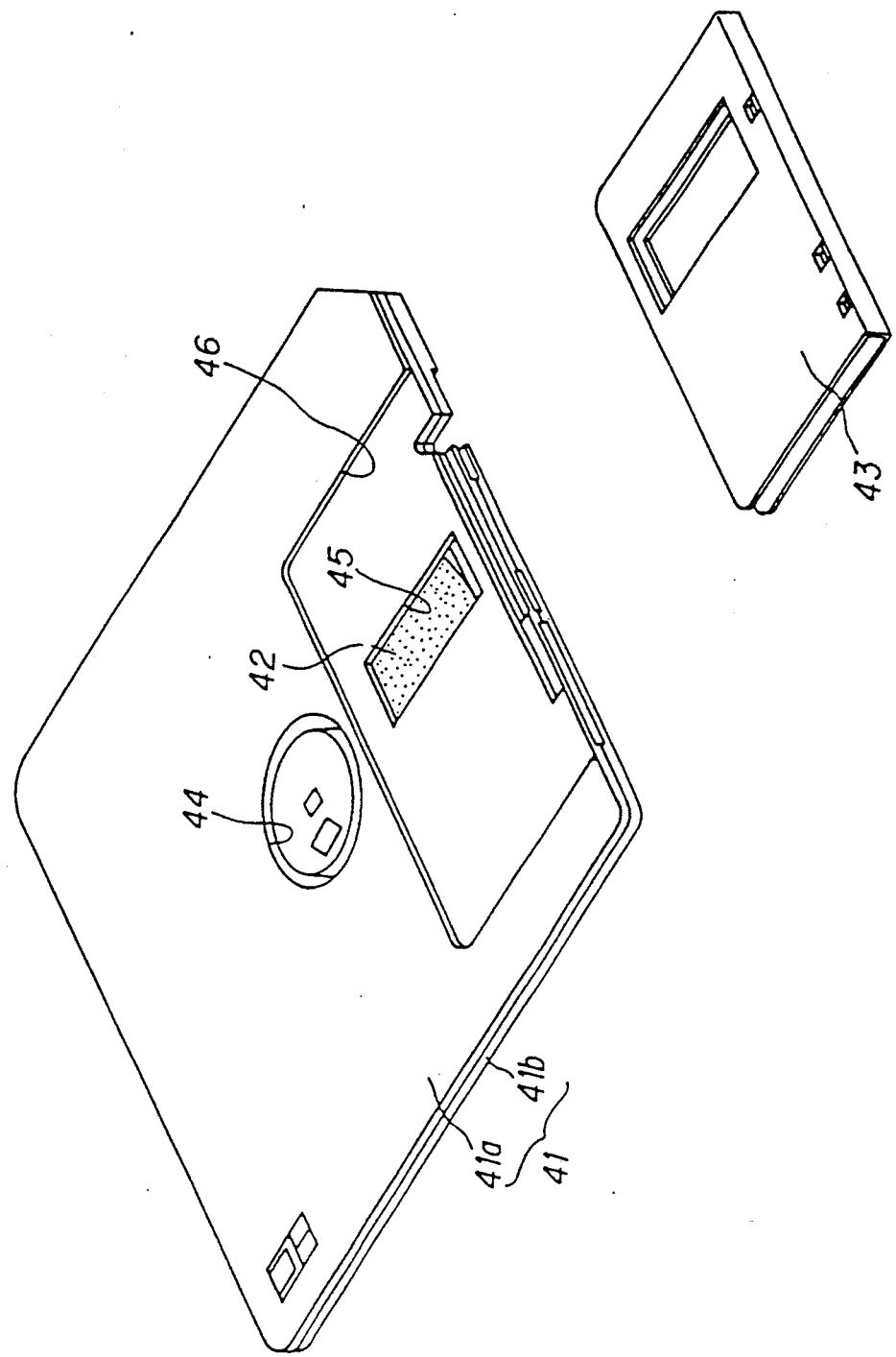
FIG. 9 is an exploded perspective view of a magnetic disk cartridge according to another example of the present invention.
Figure 10:
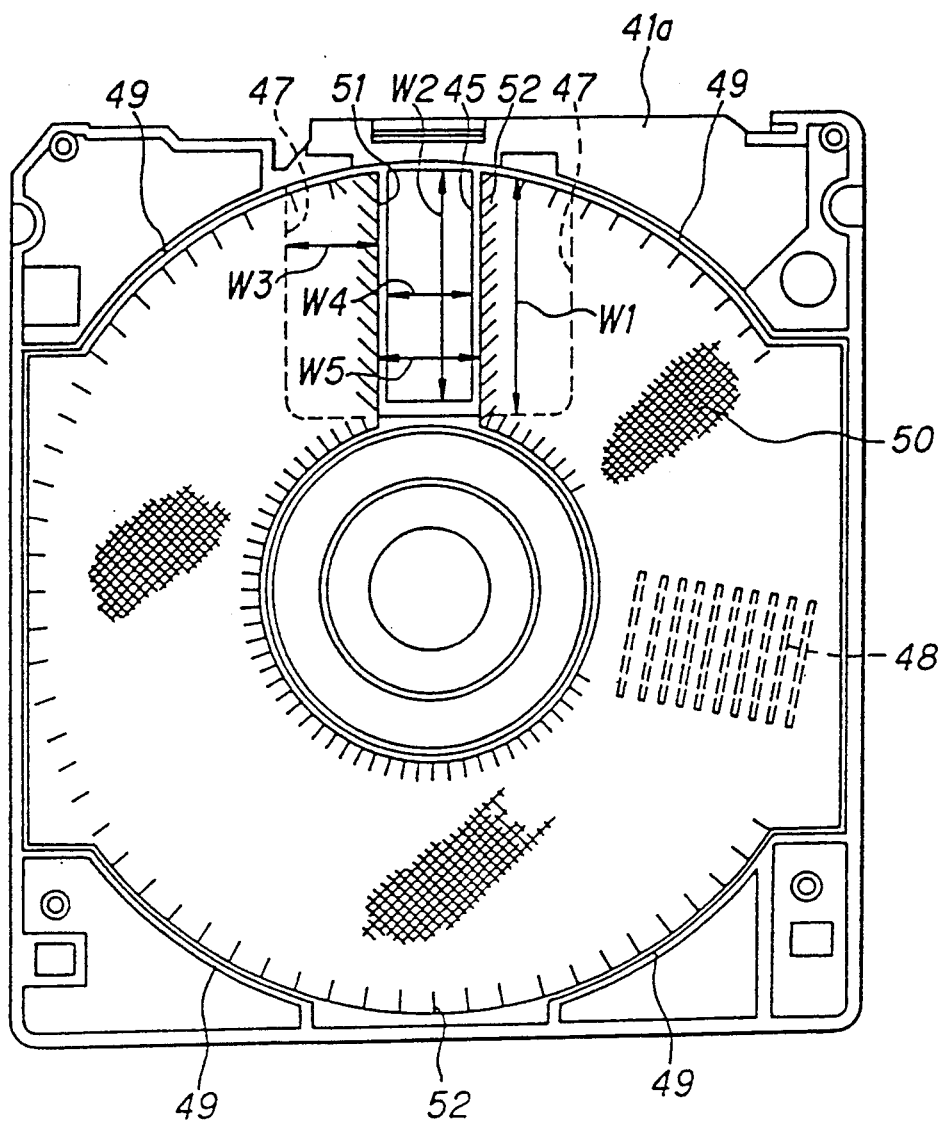
FIG. 10 is a bottom view showing the state when a cleaning sheet is adhered to an upper case.
Figure 11:
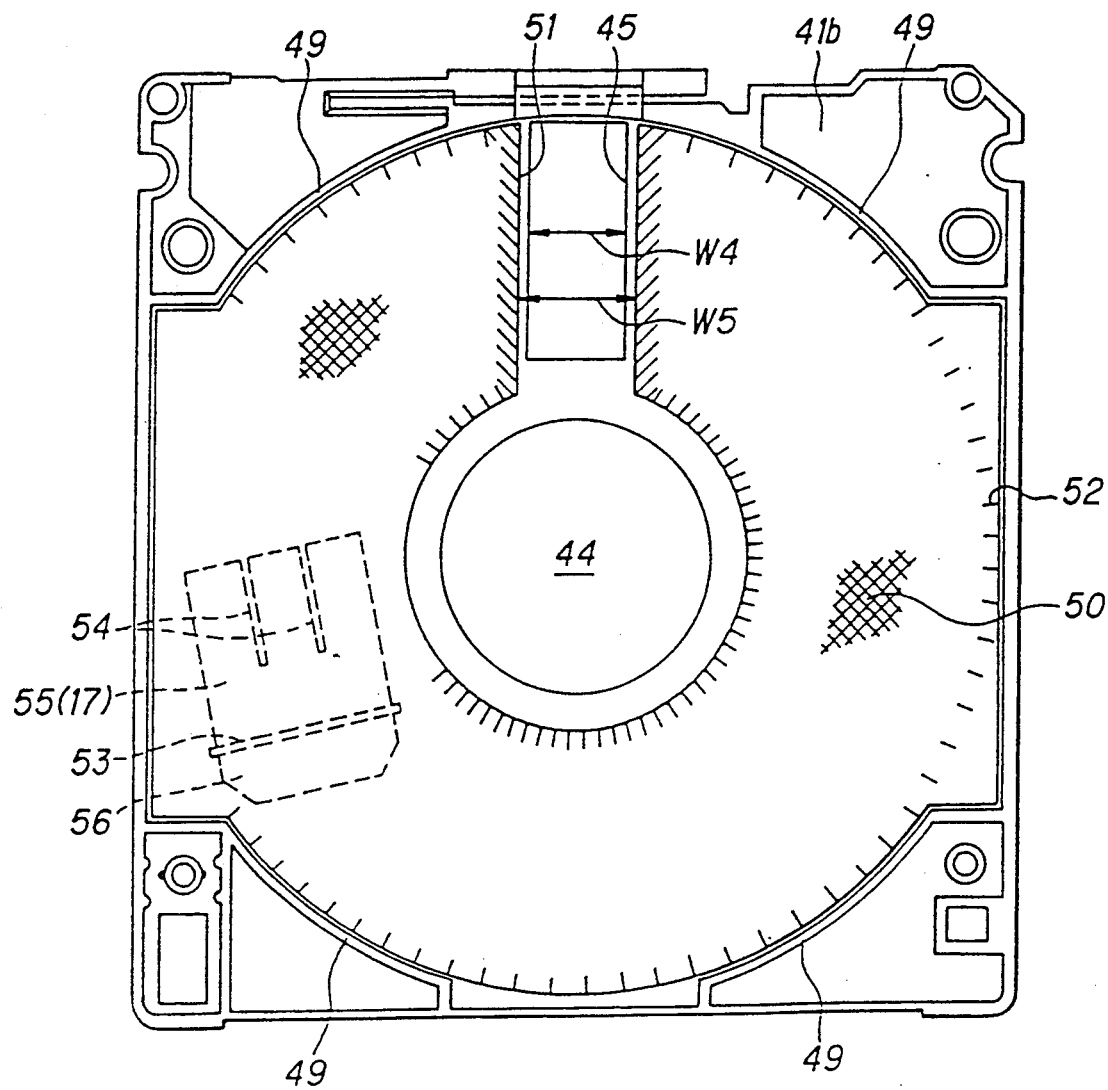
FIG. 11 is a plan view showing the state when a cleaning sheet is adhered to a lower case.
Figure 12:
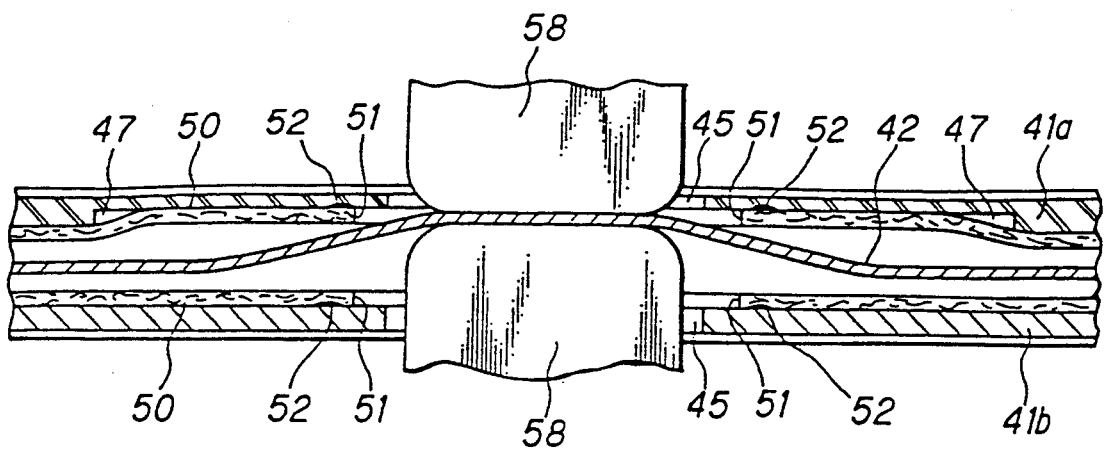
FIG. 12 is an enlarged cross sectional view of the vicinity of a magnetic head insert port to show how the magnetic disk cartridge is used.
Figure 13:
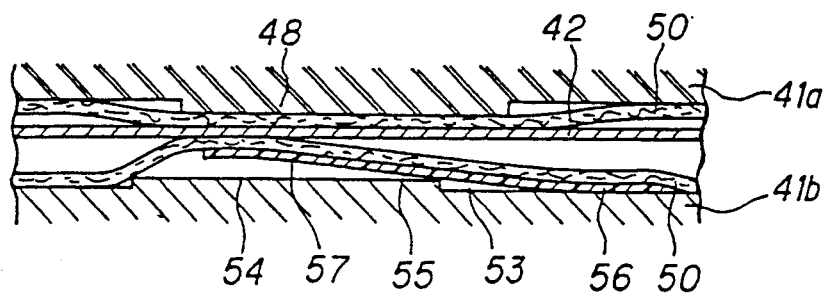
FIG. 13 is an enlarged cross sectional view of the vicinity of the elastic piece of the magnetic disk cartridge.
Figure 14:
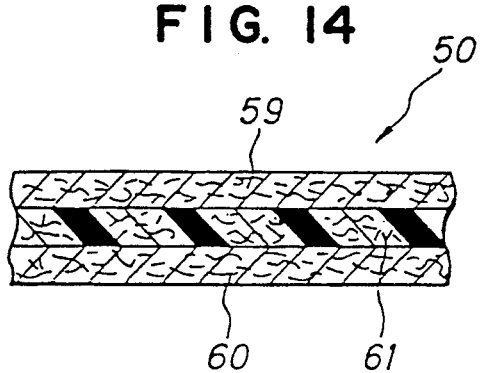
FIG. 14 is an enlarged cross sectional view of a cleaning sheet.
Figure 15:
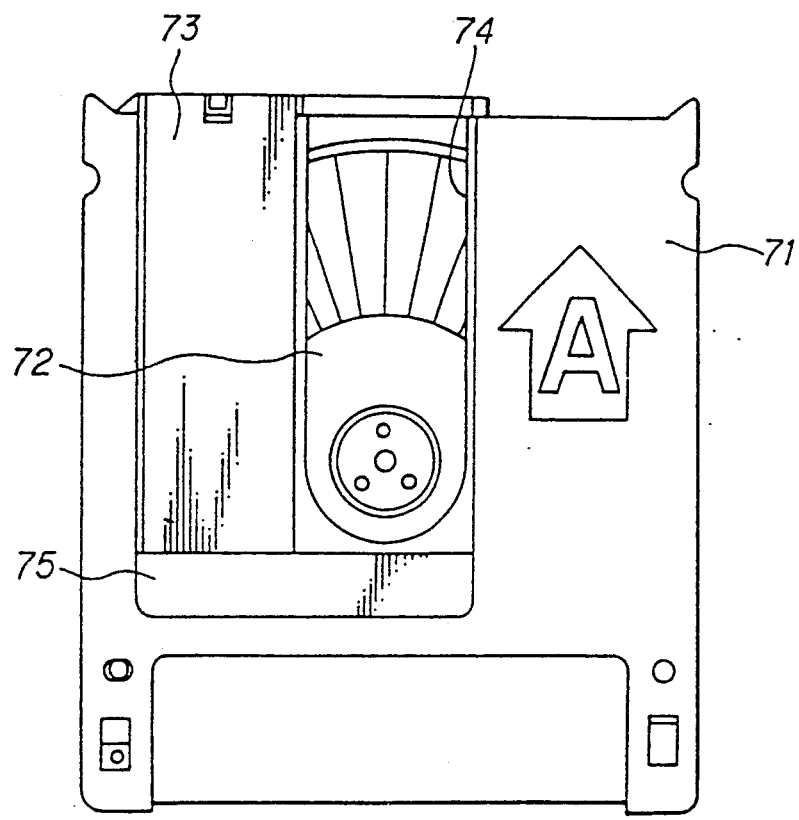
FIG. 15 is a plan view of an optical disk cartridge according to another example of the present invention.

FIGS. 9 to 14 are diagrams explaining a magnetic disk cartridge according to other example of the present invention, wherein FIG. 9 is an exploded perspective view of the disk cartridge, FIG. 10 is a bottom view showing the state that a cleaning sheet is adhered to an upper case, FIG. 11 is a plan view showing the state that a cleaning sheet is adhered to a lower case, FIG. 12 is an enlarged cross sectional view of the vicinity of a magnetic head insert port to shown how the magnetic disk cartridge is used, FIG. 13 is an enlarged cross sectional view of the vicinity of the elastic piece of the magnetic disk cartridge, and FIG. 14 is an enlarged cross sectional view of the cleaning sheet.

The magnetic disk cartridge is mainly composed of a cartridge case 41, a magnetic disk 42 rotationally accommodated therein and a shutter 43 movably supported by the cartridge case 41.

The cartridge case 41 is composed of the upper case 41a and the lower case 41b which are injection molded from a material to be described below.

The lower case 41b has an opening 44 defined substantially at the center thereof into which a rotation drive shaft is inserted, a rectangular head insert port 45 is provided at the vicinity of the opening 44, and a head insert port 45 similar to the above is provided to the upper case 41a. As shown in FIG. 9, a slightly recessed portion 46 is defined in the vicinity of the front surface of each of the upper and lower cases 41a, 41b to regulate the range within which the above shutter 43 can move and the above magnetic head insert port 45 is defined at the intermediate position of the recessed portion 46.

As shown in FIG. 11, spot faced recesses 47, 47 are defined to the inside of the upper case 41a on the right and left sides of the magnetic head insert port 45, respectively. The longitudinal width W1 of the recess 47 is substantially the same as the longitudinal width (lengthwise width) of the magnetic head insert port 45 W2 and the lateral width W3 of the recess 47 is regulated to 0.3 times or more the width (lateral width) W4 of the magnetic head insert port 45 perpendicular to the longitudinal direction thereof and preferably 0.5 to 1.5 times the width.

A multiplicity of straight extending projections 48 are provided on the upper case 41a on the upstream side in the disk rotating direction of the magnetic head insert port 45 and the two projections on both sides thereof are a little higher than the projections 48 held therebetween.

An arc-shaped regulation rib 49 projects from the inside of the upper case 41a to regulate the accommodating position of the magnetic disk 42 and a portion thereof extends along the edge of the above recesses 47 to serve as a reinforcing member of the periphery of the recesses 47.

A substantially C-shaped cleaning sheet 50 is inserted into the inside of the regulation rib 49. The opening 51 of the cleaning sheet 50 defined at the position thereof corresponding to the magnetic head insertion port 45 has a lateral width W5 which is designed to be a little larger than the lateral width W4 of the magnetic head insert port 45. The above recesses 47 and projections 48 are covered by the cleaning sheet 50 placed on the inner surface of the upper case 41a and the periphery of the cleaning sheet 50 is ultrasonic welded to the upper case 41a. As described above, since the recess 47 of the upper case 41a has a sufficient area, the edge of the opening 51 in the cleaning sheet 50 can be ultrasonic welded 52 in the recess 47, as shown in FIG. 12.

As shown in FIGS. 11 and 13, a projection support 53 and a sticking prevention raised stripe 54 are provided on the inner surface of the lower case 41b at the position thereof substantially corresponding to the projections 48 of the upper case 41a. As shown in FIGS. 11 and 13, the base 56 of an elastic piece 55 made of a plastic sheet bent is fixed to the inner surface of the lower case 41b in the vicinity of the support 53 by a suitable means such as adhesion, heat melting or the like. The free end 57 of the elastic piece 55 is supported with the support 53 and held in an inclined state.

A regulation rib 49 also projects from the inner surface of the lower case 41b and a cleaning sheet 50 is disposed on the inner surface thereof. The opening 51 of the cleaning sheet 50 defined at the position thereof corresponding to the magnetic head insertion port 45 has a lateral width W5 which is designed to be a little larger than the lateral width W4 of the magnetic head insert port 45. The above elastic piece 55 is covered by placing the cleaning sheet 50 on the inside of the lower case 41b and the periphery of the cleaning sheet 50 is ultrasonic welded 52 to the lower case 41b, but the periphery of the elastic piece 55 is not ultrasonic welded 52.

As shown in FIG. 13, when a magnetic disk cartridge is assembled by combining the upper and lower cases 41a and 41b, the cleaning sheet 50 is partially lifted from the lower case 41b with the elastic piece 55 and the lifted portion thereof is a little pressed downward with the projections 48 disposed to the upper case 41a, so that the magnetic disk 42 is elastically held between the upper and lower cleaning sheets 50, 50. Then, as the magnetic disk 42 rotates, the surfaces of the disk are cleaned with the cleaning sheets 50, 50.

FIG. 12 shows how the magnetic disk cartridge is used, wherein the magnetic head is designated 58.

As shown in FIG. 14, the above cleaning sheet 50 has a three-layered structure. More specifically, the cleaning sheet 50 is provided with a disk side non-woven fabric layer 59 confronting a magnetic disk 42, a case side non-woven fabric layer 60 confronting a cartridge case 1, and an intermediate non-woven fabric layer 61 connecting the disk side non-woven fabric layer 59 to the case side non-woven fabric layer 60.

The above disk side non-woven fabric layer 59 and the case side non-woven fabric layer 60 are composed of rayon fiber and the front side thereof cannot be discriminated from the backside thereof. The rayon fiber includes viscose rayon, copper ammonium rayon, acetate rayon and the like. The rayon fiber (staple) has a tensile strength of about 2.5 to 3.1 g/D, an elongation of about 16 to 22%, an elongated elastic modulus (when elongated by 3%) of about 55 to 80%, and a specific gravity of about 1.50 to 1.52.

The above intermediate non-woven fabric layer 61 is composed of a mixed fiber layer of rayon fiber and polyamide fiber. The mixing ratio of the rayon fiber and polyamide fiber (rayon/polyamide) is suitably selected within the range of from about 1/9 to 9/1 and in particular the range of from 3/7 to 7/3 is preferable.

The polyamide fiber uses a condensation compound of adipic acid and hexamethylene-diamine as material monomer. The polyamide filter has a tensile strength of about 4.5 to 7.5 g/D, an elongation of 25 to 60%, an elongated elastic modulus (when elongated by 3%) of about 95 to 100%, and a specific gravity of about 1.14.

Although the cleaning sheet 50 can be composed only of rayon fiber, the provision of the intermediate non-woven fabric layer 61 between the above disk side non-woven fabric layer 59 and the case side non-woven fabric layer 60 enables the cleaning sheet 50 to be thermally welded to the cartridge case in a good state.

As the above intermediate non-woven fabric 61, for example, various kinds of thermoplastic fiber such as polyethylene terephthalate, polyethylene, polypropylene, polystyrene, polyvinylchloride, acrylic resin and the like can be preferably used in addition to the above mixture of rayon fiber and polyamide fiber. In particular, since the rayon fiber is used to the disk side non-woven fiber layer 59 and case side non-woven fiber layer 60 as described above, the intermediate non-woven fiber layer 61 is preferably composed of a mixed fiber layer containing the rayon fiber, taking the intimacy between both layers 59, 60 into consideration.

A weight per unit area of the cleaning sheet 50 is not particularly limited but suitably about 20 to 50 g/m². Note that the weight per unit area used here is an average value of the weights of 5 specimens of 50×50 cm.

The thickness of the cleaning sheet 60 is suitably 150 to 300 micrometers. The specific physical properties of the cleaning sheet 60 according to the example is as follows.

TABLE 2

| | |
|---|---|
| Weight per Unit Area (g/m²) | 43 |
| Thickness (um) | 220 |
| Tensile Strength (Kg/5 cm) | |
| Longitudinal Direction | 5.50 |
| Lateral Direction | 1.10 |
| Charge Damping Time (sec) Under the Conditions: Temperature 20° C., Humidity 65% | 0.6 |
| Surface Electric Resistance (ohm) | $9 \times 10^{10}$ |
| Coefficient of Friction to Magnetic Disk | 1 |

As described above, the cleaning sheet 50 is formed to the three-layered structure, but when a magnetic disk cartridge is actually assembled by using the cleaning sheet 50, all of the fiber in contact with the magnetic disk 42 are not always rayon fiber and a very small portion of the thermoplastic fiber (polyamide fiber) in the intermediate non-woven fabric layer 61, which emerges to the surface of the cleaning sheet 50 by being tangled with other fiber, may come into contact with the magnetic disk 42. Even in this case, however, the ratio of the thermoplastic fiber in contact with the magnetic disk 42 is about 10% or less and about 100% of the fiber in contact with the magnetic disk 42 is substantially the rayon fiber.

Although this example explains the case of the three-layered cleaning sheet, other than this sheet, for example, non-woven fabric composed only of rayon fiber, a paper composed of rayon fiber and other fiber (e.g., polyethylene terephthalate fiber, acrylic fiber, polypropylene fiber, and polyamide fiber, etc.) may be used in addition to it.

Next, the material of the cartridge case will be described. The cartridge case according to the present invention is formed from the following materials:

(1) composition of uniformly dispersed styrol resin and polycarbonate resin;
(2) composition of uniformly dispersed styrol resin and nitrogen containing resin;
(3) composition of uniformly dispersed styrol resin and ester resin;
(4) styrol resin styrene of which is partially substituted with α-methylstyrene;
(5) styrene-maleic anhydride copolymer modified with rubber;
(6) composition of polypropylene polymer containing an inorganic filler dispersed therein;
(7) copolymer of N-substituted maleimide resin and styrol resin; and
(8) composition of uniformly dispersed N-substituted maleimide resin and styrol resin;

Next, these materials will be individually described.

(1) Polymeralloy of Stryol Resin and Polycarbonate Resin

The above styrol resin includes, for example, polystyrene, a copolymer of styrene and acrylonitrile (AS resin, content of acrylonitrile: 20 to 30 wt %, a copolymer of acrylonitrile, butadiene, and styrene (ABS resin), etc. The ABS resin is classified into a blend type and graft type. The blend type ABS resin is made by mixing a predetermined amount of nitrile rubber (NBR) to a copolymer of styrene and acrylonitrile (AS resin), whereas the graft type ABS resin is made by copolymerizing styrene and acrylonitrile under the presence of polybutadiene. Since the styrene-acrylonitrile copolymer is partially graft polymerized with polybutadiene at this time, the graft type ABS resin has particularly excellent impact resistance.

These styrol resins will be used in the respective compositions to be described below in the similar manner.

Polycarbonate has a high Tg (glass transition temperature) of 155° C. and an elastic modulus of about 23,000 Kgf/cm². The styrol resin and polycarbonate resin have good compatibility and improved heat and impact resistance as compared with the case in which only the ABS resin is used and also have improved impact strength at a low temperature and an improved resin flowing property as compared with the case in which only the polycarbonate resin is used.

Note that the content of the polycarbonate resin in the polymeralloy is preferably 30 to 70 wt % and more preferably 40 to 60 wt %.

The basic physical properties of polymeralloy containing 50 wt % of a polycarbonate resin (polymeralloy A), polymeralloy containing 65 wt % of a polycarbonate resin (polymeralloy B) and an ABS resin only were measured and Table 5 shows the results thereof.

As apparent from Table 5, the polymeralloys A and B according to the present invention are excellent in the mechanical properties such as tensile strength, elongation at break, bending strength, Izot impact strength, etc. and further have a high thermal deformation temperature.

TABLE 5

| Physical Properties | Unit | Measuring Method | Polymeralloy A |
|---|---|---|---|

TABLE 5-continued

| Physical Properties | Unit | Measuring Method | |
|---|---|---|---|
| Tensile Strength | Kg/cm$^2$ | ASTM-D-638 | 640 |
| Elongation at Break | % | ASTM-D-638 | >100 |
| Bending Strength | Kg/cm$^2$ | ASTM-D-790 | 950 |
| Bending Elastic Modulus | Kg/cm$^2$ | ASTM-D-790 | 25000 |
| Izot Impact Strength | kg·cm/cm | ASTM-D-256 | 24 |
| Rockwell Hardness | R Scale | ASTM-D-785 | 117 |
| Thermal Deformation Temperature | °C. | ASTM-D-648 | 112 |
| | | | Polymeralloy B |
| Tensile Strength | Kg/cm$^2$ | ASTM-D-638 | 590 |
| Elongation at Break | % | ASTM-D-638 | >100 |
| Bending Strength | Kg/cm$^2$ | ASTM-D-790 | 960 |
| Bending Elastic Modulus | Kg/cm$^2$ | ASTM-D-790 | 24400 |
| Izot Impact Strength | kg·cm/cm | ASTM-D-256 | 16 |
| Rockwell Hardness | R Scale | ASTM-D-785 | 119 |
| Thermal Deformation Temperature | °C. | ASTM-D-648 | 105 |
| | | | ABS Resin |
| Tensile Strength | Kg/cm$^2$ | ASTM-D-638 | 517 |
| Elongation at Break | % | ASTM-D-638 | 13 |
| Bending Strength | Kg/cm$^2$ | ASTM-D-790 | 820 |
| Bending Elastic Modulus | Kg/cm$^2$ | ASTM-D-790 | 26900 |
| Izot Impact Strength | kg·cm/cm | ASTM-D-256 | 13 |
| Rockwell Hardness | R Scale | ASTM-D-785 | 114 |
| Thermal Deformation Temperature | °C. | ASTM-D-648 | 90 |

(2) Polymeralloy of Styrol Resin and Nitrogen Containing Resin

The above nitrogen containing resin includes, for example, polyamide resin, polyimide resin or polyamideimide resin.

The above polyamide resin includes, for example, an open-ring lactic polymerized compound such as nylon-6 and nylon-12, an amino carboxylic acid polymer such as nylon-11 and a condensation polymer of diamine and dicarboxylic acid such as nylon-66 and nylon 610.

The polymeralloy particularly has improved solvent resistance as compared with the case in which only the ABS resin is used, which can not only prevent an organic solvent from adhering to the cartridge case and roughing the surface thereof to thereby deteriorate the commercial value thereof but also prevent the cartridge case from being deformed by a label adhered to the surface of the cartridge case.

More specifically, the label has an adhesive layer formed thereon and the adhesive layer contains an organic solvent. Since a conventional cartridge case composed of the ABS resin only does not always have sufficient solvent resistance, the case may be deformed in a long period by being eroded by the organic solvent in the adhesive layer. Further, because of this problem, the kind of organic solvents used in the adhesive layer is limited and there are disadvantages that a label having an insufficient adhesive force cannot help being used or the like. In this respect, when the excellent solvent resistance as that of the polymeralloy of the present example is provided, the cartridge case is prevented from being deformed by being eroded by the organic solvent in the adhesive layer and further the kind of solvents used in the adhesive layer is not limited, so that a label having a sufficient adhesive force can be used.

Further, impact strength and temperature dependency of the impact strength can be improved as compared with the case in which only a polyamide resin is used.

The above polyimide resin is obtained by condensation polymerizing, for example, pylomellitic anhydride and diamine and a polyimide resin using p,p'-diamino diphenyl ether is particularly excellent in heat resistance.

The above polyimide resin introduces an amide bond to the main chain thereof and this bond provides the polyimide with flexibility by which processability can be improved.

Note that the content of the nitrogen containing resin in the polymeralloy is suitably 30 to 70 wt % and 40 to 60 wt % is particularly preferable.

(3) Polymeralloy of Styrol Resin and Ester Resin

The above ester resin is preferably saturated polyester resin such as polybutylene terephthalate (PBT), polyethylene terephthalate (PET), etc. This polymeralloy is excellent in mechanical strength such as bending strength, tensile strength, etc., the sliding property of a shutter to a cartridge case, heat resistance and the like.

Note that the content of the ester resin in the polymeralloy is suitably 30 to 70 wt % and 40 to 60 wt % is particularly preferable.

A suitable amount of antioxidant, UV absorbant, inorganic filler, etc. can be added to the above respective polymeralloys.

(4) Styrol Resin in Which a Portion of Styrene is Substituted by α-Methylstyrene A styrol resin similar to those mentioned above can be used. Further, the styrol resin can be added with a rubber substance. The rubber substance includes, for example, diene rubber such as butadiene rubber, styrene-butadiene rubber, isoprene rubber, acrylonitrile-butadiene rubber and chloroprene, olefin rubber such as butyl rubber, ethylene-propylene rubber, acrylic rubber, chlorosulfonated polyethylene rubber, fluorine-contained rubber, silicone rubber, urethane rubber, etc.

The content of α-methylstyrene in the above styrol resin is preferably regulated to the range of from 20 to 60 wt %. When the content of the α-methylstyrene is less than 20 wt %, heat resistance is not sufficiently improved, whereas when the content of thereof exceeds 60 wt %, a molded member tends to be mechanically fragile and in particular it is not preferable when a member having a thin wall such as the magnetic disk cartridge is molded.

(5) Styrene-Maleic Anhydride Copolymer Modified with Rubber

The styrene-maleic anhydride copolymer modified with rubber is obtained by polymerizing styrene and maleic anhydride using a rubber component under the presence of a radical polymerization initiator.

The above rubber component includes a mixture of one or two of the following organic compounds:
(1) butadiene rubber;
(2) butadiene-styrene rubber (content of butadiene: 60 to 95 wt %);
(3) butadiene-acrylic rubber (content of butadiene: 60 to 95 wt %);
(4) isoprene rubber;
(5) isoprene-styrene rubber (content of styrene: 60 to 95 wt %);
(6) isoprene-acrylic rubber (content of acrylonitrile: 60 to 95 wt %); and
(7) ethylene-propyrene rubber The content of the rubber component in the rubber modified polymer is 2 to 40 wt % and preferably 5 to 25 wt %.

The mixing ratio of a styrene monomer and maleic anhydride represented by styrene monomer/maleic anhydride (mol ratio) is in the range of 1.4–49/1 and preferably in the range of 4.6–17/1.

The rubber modified polymer is obtained by, for example, adding a suitable amount of the above rubber component, styrene monomer, maleic anhydride, radical polymerization initiator and the like to an organic solvent such as methyl ethyl ketone or the like and polymerizing the same under the heating condition of 75° to 140° C.

(6) Composition of Polypropylene Polymer Containing Inorganic Filler Dispersed Therein The polypropylene polymer composition is mainly composed of a polypropylene polymer added with a suitable amount of an olefin polymer subjected to an oxidizing treatment.

The above polypropylene polymer includes the following:
(1) propylene single polymer;
(2) copolymer of propylene and ethylene; and
(3) copolymer of propylene and other α-olefin having 8 carbon atoms at the most.

Note that the content of ethylene or α-olefin in the above copolymer is 20 wt % at the most. Further, the copolymer may be any of a random copolymer or block copolymer.

The molecular structure of the polypropylene polymer is regularly arranged as an isotactic polymer and thus has good crystallinity but sometimes contains a certain amount of a non-crystalline polypropylene polymer. The melt flow index (JIS K6758) of the polypropylene polymer is 0.5–50/10 minutes and the specific gravity thereof is 0.88 to 0.92.

An olefin polymer used to make an acid treated substance of the above olefin polymer includes the followings:
(1) ethylene single polymer;
(2) propylene single polymer;
(3) copolymer of ethylene and propylene (content of ethylene in the copolymer: 30 wt % or less);
(4) copolymer of ethylene and α-olefin having 8 carbon atoms or less (content of α-olefin in the copolymer:20 wt % or less);
(5) copolymer of propylene and α-olefin having 8 carbon atoms or less (content of α-olefin in the copolymer: 20 wt % or less);
(6) copolymer of ethylene, propylene and other α-olefin (content of ethylene and α-olefin in the copolymer: 30 wt % or less and 20 wt % or less, respectively); and
(7) copolymer of ethylene and a vinyl compound such as vinyl acetate, acrylic ester and methacrylic ester (content of the vinyl compound in the copolymer: 50 mol % or less)

An ethylene single polymer, propylene single polymer and ethylene-propylene copolymer of these olefin polymers are particularly preferable.

An oxidized derivative of the olefin polymer is obtained by treating the above olefin polymer with unsaturated carboxylic acid and/or the anhydride thereof under the presence of an organic peroxide.

The above unsaturated carboxylic acid is monobasic or dibasic carboxylic acid having at least one double bond in the molecular structure thereof. The monobasic carboxylic acid includes, for example, acrylic acid or methacrylic acid and the dibasic carboxylic acid includes, for example, maleic acid. The anhydride of the above unsaturated carboxylic acid includes, for example, maleic anhydride or hymic anhydride.

The above organic peroxide includes, for example, the following organic compounds:
(1) benzoyl peroxide
(2) lauryl peroxide
(3) azo bis iso-butyl nitrile
(4) 2,5-dimethylhexa-2,5-hydroxy peroxide
(5) cumene peroxide
(6) dicumyl peroxide
(7) tertiary-butyl hydro peroxide
(8) α-α'bis(tertiary-butyl peroxy di-isopropyl)benzene
(9) di-tertiary-butyl peroxide The content of carboxylic acid or the anhydride thereof in the olefin polymer is $10^{-7}$ to $10^{-3}$ mol/g while the polymer is subjected to the acid treatment.

The above inorganic filler, for example, calcium carbonate, talc, silicon oxide, aluminium oxide, carbon black, clay, gypsum, calcium sulfonic anhydride, bentonite, iron oxide, titanium white, etc is used in a powder or fiber state. In particular, the above calcium carbonate, talc and silicon oxide are preferred.

These inorganic fillers are surface treated with epoxy resin and have a very thin cured film of the epoxy resin on the surface thereof. To obtain the above, a suitable amount of, for example, an amine curing agent or acid anhydride curing agent, etc. are added for the treatment of the fillers.

Note that although the fillers are surface treated with the epoxy resin in this example, they may be surface treated with organic acid such as carboxylic acid, etc. or silane coupling agent, etc.

The composition ratio of the above acid treated olefin polymer to 100 parts by weight of the above polypropylene polymer is 2 to 40 parts by weight and preferably 3 to 30 parts by weight. When the composition ratio of the above acid treated olefin polymer to 100 parts by weight of the polypropylene polymer is less than 20 parts by weight, impact resistance, and aging resistance at high temperature cannot be sufficiently improved, whereas even if the composition ratio of the above acid treated olefin to 100 parts by weight of the polypropylene polymer exceeds 40 parts by weight, further improvement in physical properties cannot be expected and thus it is not preferable because the adhesive property thereof rather increases and the handling thereof becomes inconvenient.

The content of the above inorganic filler is 5 to 60 wt % and preferably 20 to 55 wt %. When the content of the inorganic filler is less than 5 wt %, the meritorious effect of the addition thereof is not sufficient and an oscillation loss coefficient in ultrasonic welding is still large, with the result in an insufficient welding strength of the cleaning sheet to the cartridge case. In addition, rigidity cannot be sufficiently increased and further an aging property at a high temperature and thermal deformation property, etc. are not either sufficiently improved. Whereas, when the content of the filler exceeds 60 wt %, a molding material does not flow well in a metal mold and thus flow marks are made on the surface of a molded product, which adversely affects the external appearance thereof.

An example of the composition of the molding material is as follows:

| | |
|---|---|
| ethylene-propylene block copolymer | 100 parts by weight |
| acrylic acid treated polypropylene | 29 parts by weight |
| heavy calcium carbonate surface treated with epoxy resin and having an average grain size of 3 μm | 157 parts by weight |

(7) Copolymer of N-substituted Maleimide Resin and Styrol Resin

A maleimide monomer is obtained by a reaction of maleic anhydride with amines and the above N-substituted maleimide resin includes, for example, the following.
(1) N-phenyl maleimide
(2) N-cyclohexyl maleimide
(3) N-methyl phenyl maleimide
(4) N-chloro phenyl maleimide
(5) N-hydroxy phenyl maleimide
(6) N-methoxy phenyl maleimide
(7) N-stearyl maleimide
(8) N-methyl maleimide
(9) N-ethyl maleimide
(10) N-buthyl maleimide
(11) N-lauryl maleimide The above N-phenyl maleimide has malenic anhydride and aniline as starting materials and amide acid is made at a first stage and an imide reaction is carried out at a second stage. Since the N-phenyl maleimide has radial polymerizability and ion polymerizability, it easily copolymerizes with other monomers.

ABS resin can be particularly advantageously used as styrol resin. When about 10 to 20 wt % of N-substituted maleimide resin (e.g., N-phenyl maleimide) is copolymerized with styrol resin (e.g., ABS resin), a thermal deformation temperature of 125 to 130 can be obtained.

(8) Polymeralloy of N-substituted Maleimide Resin and Styrol Resin

As the above styrol resin, AS resin and ABS resin, etc., for example, are preferable. Heat resistance and moldability can be improved by using the polymeralloy.

FIG. 16 is a diagram explaining the present invention applied to an optical disk cartridge.

As shown in the figure, the optical disk cartridge is mainly composed of a cartridge case 71, an optical disk 72 rotationally accommodated therein and a shutter 73 slidingly supported by the above cartridge case 71

In the figure, 74 designates a head access port and 75 designates a shutter supporting plate.

The above cartridge case 71 is molded from the synthetic resin materials as described above.

Next, the increased amount of the warping of the cartridge cases (3.5 inches) molded from the respective materials were measured after the materials had been left under the conditions of 85° C. and 40% RH for 96 hours (4 days), and Table 4 shows the results of the measurement. Note that the increased amount of the warping was measured with a configuration measuring instrument from Kosaka Kenkyusho. The relationship between Specimen No. and the material of the cartridge cases are as shown in Table 3 below.

TABLE 3

| Specimen No. | Material |
|---|---|
| No. 1 (Example 4) | Polymeralloy of ABS resin and Polycarbonate Resin |
| No. 2 (Example 5) | Polymeralloy of ABS resin and Polyamide Resin |
| No. 3 | Polymeralloy of ABS Resin and |

TABLE 3-continued

| Specimen No. | Material |
|---|---|
| (Example 6) | Polybutylene Terephthalate |
| No. 4 (Example 7) | ABS Resin Styrene of which is Partially Substituted with α-Methylstyrene |
| No. 5 (Example 8) | Styrene-Maleic Anhydride Copolymer Modified with Rubber |
| No. 6 (Example 9) | Polypropylene Resin Mixed and Dispersed with Calcium Carbonate Acid Fine Powder |
| No. 7 (Example 10) | Copolymer of ABS Resin and N-Phenyl Maleid |
| No. 8 (Example 11) | Polymeralloy of ABS resin and N-Phenyl Maleid |
| No. 9 (Comparative Example 4) | ABS Resin |

TABLE 4

| Specimen No. | Increased Amount of Warping (mm) |
|---|---|
| (1) | 0.04 |
| (2) | 0.07 |
| (3) | 0.06 |
| (4) | 0.04 |
| (5) | 0.05 |
| (6) | 0.04 |
| (7) | 0.04 |
| (8) | 0.04 |
| (9) | 0.97 |

As apparent from Table 4, Specimens (1) to (8) of the examples according to the present invention have a less amount of warping as compared with that of Specimen (9) of Comparative Example (prior art) and thus are excellent in heat resistance.

Further, as described above, according to the present invention, when a flexible magnetic disk, which is made in such a manner that an magnetic film is formed on a base film and then the base film with the magnetic film is subjected to a heat treatment under a high temperature/high humidity conditions of, for example, 90° C. or more of temperature and less than 20% RH of humidity, has the maximum amount of thermal contraction of 30 micrometers or less after having been left for 96 hours in the environment of 85° C. and 40% RH, a flexible magnetic disk of high reliability can be provided which has a very low level variation of signals even if it is used at a high temperature.

Note, it can be also considered that only the base film is subjected to the heat treatment before the magnetic film is formed thereon. Even if only the base film is heat treated, tension and heat are applied to the based film when the magnetic layer is formed thereon later, with the result that the base film is distorted and the meritorious effect of the heat treatment is lost, and thus this method is not preferable.

Example 4

Further, a flexible disk was made by using the following magnetic paint as another example.

| Composition Ratio of Magnetic Paint | |
|---|---|
| Co containing $\gamma$-$Fe_2O_3$ (Coercive Force: 740 Oe, Average Particle Dia.: 0.4 μm, Axial Ratio: 10) | 100 parts by weight |
| Nitrocellulose | 19 parts by weight |
| Polyurethane Resin (Tg: 42° C.) | 12 parts by weight |
| Alumina Fine Particles | 10 parts by weight |

-continued

| Composition Ratio of Magnetic Paint | |
|---|---|
| (Average Particle Dia.: 0.43 μm, Spherical) Carbon Black 1 | 6 parts by weight |
| (Average Particle Dia: 30 mμm) Carbon Black 2 | 10 parts by weight |
| (Average Particle Dia: 75 mμm) Oleyl Oleate | 6 parts by weight |
| Butyl Cellosorb Stearate | 1 part by weight |
| Cyclohexanone | 200 parts by weight |
| Toluene | 200 parts by weight |

The composition was mixed and dispersed in a ball mill for 72 hours, added with 8 parts by weight of a three functional isocyanate linking agent and further dispersed for 1 hour to make a magnetic paint. The magnetic paint was coated on a wide base film of 75 micrometers thick as shown in Table 6 and dried, and the base film was subjected to a calendering treatment to form a magnetic layer of 0.9 micrometer thick to provide a wide web film.

Disks having an outer diameter of 3.5 inches were stamped from the web film to make flexible magnetic disks.

The output level, expansion coefficient related to temperature, expansion coefficient related to humidity, softening point, and disk deformability of the thus obtained disks (recording density: 135 TPI) were measured, and Table 6 shows the result of the measurement.

The above output level is the output variation of the 2F signals from the side 0 track and the outermost circumference track caused by the following change in the environmental conditions when measured by using a floppy disk drive unit for 3.5 inches floppy disk of 2M bytes.

Conditions 1

As writing conditions, a signal was recorded at 5° C. and 10% RH and the average output from the one round of a track was measured under the same conditions and assumed to be 100%.

Thereafter, as reading conditions, a disk drive unit was left under the environment of 85° C. and 90% RH for 24 hours and then the minimum output of outputs from the one round of a track was expressed as a ratio to the average output under the same conditions as the above writing conditions.

Conditions 2

An output level was measured under the same conditions as above except that writing conditions and environmental conditions when a reference output was measured were set to 5° C. and 90% RH and the environmental conditions at reading were set to 85° C. and 10% RH.

The expansion coefficient related to temperature and expansion coefficient related to humidity were measured with respect to 10 directions each divided into 18° angle from a reference line arbitrarily drawn from the center of a disk in the radial direction thereof.

Note that as the expansion coefficient related to temperature, the value in which an off track amount had a tendency to increase was selected from the maximum value and the minimum value.

Further, the average value of the expansion coefficients related to humidity was employed because the differences of values thereof were small in the respective directions.

Softening point was obtained from the turning point of the storage elasticity of a flexible magnetic disk by measuring the dynamic viscous elasticity thereof.

The disk deformability was measured in such a manner that the disk was loaded on a flexible magnetic disk drive unit with the magnetic head thereof set to a loaded state and left at 85° C. and 40% RH for 48 hours, and thereafter the presence or absence of the disk deformation at the head load position was visually observed.

As apparent from Table 6, Specimens according to the examples of the present invention have less disk deformation, and further less output level variation under the conditions 1 (writing at low temperature and low humidity and reading at high temperature and high humidity) as well as under the conditions 2 (writing at low temperature and high humidity and reading at high temperature and low humidity) as compared with Comparative Examples, and thus have higher reliability.

Note that the magnetic material used in the present invention includes magnetic metal power such as Fe metal magnetic power, and Co magnetic metal powder, etc., and barium ferrite magnetic powder in addition to the Co containing $\gamma$-$Fe_2O_3$ magnetic powder.

Further, a semiconductor cartridge such as a memory cartridge or the like in addition to the above magnetic disk cartridge and an optical disk cartridge can be effectively used as a data recording cartridge.

TABLE 6

| | Base Film | Softening Point (°C.) | Deformability | Conditions 1 | | | Conditions 2 | | |
|---|---|---|---|---|---|---|---|---|---|
| | | | | Expansion Coefficient Related to Temperature ($\times 10^{-6}$° $C.^{-1}$) | Expansion Coefficient Related to Humidity ($\times 10^{-6}$% $(RH)^{-1}$) | Output Level (%) | Expansion Coefficient Related to Temperature ($\times 10^{-6}$° $C.^{-1}$) | Expansion Coefficient Related to Humidity ($\times 10^{-6}$% $(RH)^{-1}$ less than 15 | Output Level (%) |
| Example 12 | Polyethylene Naphthalate | 121 | No | 18 | 10 | 67 | 14 | 10 | 68 |
| Example 13 | Aromatic Polyamide | 312 | No | 22 | 12 | 49 | 18 | 12 | 71 |
| Comparative Example 5 | Polyethylene Terephthalate | 84 | Yes | 18 | 10 | 66 | 15 | 10 | 70 |
| Comparative Example 6 | Polyimide (1) | 357 | No | 22 | 22 | 25 | 18 | 22 | 44 |
| Comparative Example 7 | Polyimide (2) | 290 | No | 30 | 17 | 18 | 25 | 17 | 80 |
| Comparative Example 8 | Polysulfon | 194 | No | 62 | 2 | 0 | 56 | 2 | 3 |

The present invention being thus described, it will be obvious that the same may be varied in many ways. Such variations are not to be regarded as a departure from the spirit and scope of the invention, and all such modifications as would be obvious to one skilled in the art are intended to be included with the scope of the following claims.

What is claimed is:

1. A data recording cartridge provided with a cartridge case and a recording medium accommodated therein, wherein said cartridge case is molded from at least one of the following materials:
   (1) composition of uniformly dispersed styrol resin and polycarbonate resin;
   (2) composition of uniformly dispersed styrol resin and nitrogen containing resin;
   (3) composition of uniformly dispersed styrol resin and ester resin;
   (4) styrol resin styrene of which is partially substituted with α-methylstyrene;
   (5) styrene-maleic anhydride copolymer modified with rubber;
   (6) composition of polypropylene polymer containing an inorganic filler dispersed therein;
   (7) copolymer of N-substituted maleimide resin and styrol resin; and
   (8) composition of uniformly dispersed N-substituted maleimide resin and styrol resin.

2. A data recording cartridge according to claim 1, wherein said recording medium is a magnetic disk.

3. A data recording cartridge according to claim 1, wherein said recording medium is an optical disk.

4. A magnetic disk cartridge provided with a cartridge case and a disk-shaped flexible magnetic recording medium composed of a non-magnetic base film having a magnetic thin film formed thereon and rotationally accommodated in said cartridge case, wherein said flexible magnetic recording medium has a maximum thermal contraction of 30 micrometers or less when left for 96 hours in an environment of 85° C. and 40% RH, and said cartridge case is a material selected from at least one member of the group consisting of:
   (1) composition of uniformly dispersed styrol resin and polycarbonate resin;
   (2) composition of uniformly dispersed styrol resin and nitrogen containing resin;
   (3) composition of uniformly dispersed styrol resin and ester resin;
   (4) styrol resin styrene of which is partially substituted with α-methylstyrene;
   (5) styrene-maleic anhydride copolymer modified with rubber;
   (6) composition of polypropylene polymer containing an inorganic filler dispersed therein;
   (7) copolymer of N-substituted maleimide resin and styrol resin; and
   (8) composition of uniformly dispersed N-substituted maleimide resin and styrol resin.

5. A data recording cartridge, comprising a cartridge case molded from the composition of uniformly dispersed styrol resin and polycarbonate resin wherein said polycarbonate resin is contained in the amount of 30 to 70 wt %.

6. A data recording cartridge, comprising a cartridge case molded from the composition of uniformly dispersed styrol resin and nitrogen containing resin wherein said nitrogen containing resin is contained in the amount of 30 to 70 wt %.

* * * * *